United States Patent
Wu et al.

(10) Patent No.: US 9,125,351 B2
(45) Date of Patent: Sep. 8, 2015

(54) PLANT CULTIVATION DEVICE

(71) Applicant: CHUNGHWA PICTURE TUBES, LTD., Padeh, Taoyuan (TW)

(72) Inventors: Min-Lun Wu, Toufen Township, Miaoli County (TW); Min-Chung Cheng, New Taipei (TW); Guan-Liang Lee, Taipei (TW); Che-Wei Chang, Daxi Township, Taoyuan County (TW); Wen-Li Tsai, Yangmei (TW)

(73) Assignee: CHUNGHWA PICTURE TUBES, LTD., Padeh, Taoyuan (TW)

( * ) Notice: Subject to any disclaimer, the term of this patent is extended or adjusted under 35 U.S.C. 154(b) by 101 days.

(21) Appl. No.: 14/139,070

(22) Filed: Dec. 23, 2013

(65) Prior Publication Data
US 2015/0082699 A1   Mar. 26, 2015

(30) Foreign Application Priority Data
Sep. 24, 2013   (TW) .............................. 102217836 U

(51) Int. Cl.
*A01G 31/02*   (2006.01)
*A01G 27/04*   (2006.01)

(52) U.S. Cl.
CPC ...................................... *A01G 31/02* (2013.01)

(58) Field of Classification Search
CPC ................................ A01G 31/02; A01G 27/04
USPC ...................................... 47/62 A, 62 R, 63, 81
See application file for complete search history.

(56) References Cited

U.S. PATENT DOCUMENTS

| | | | |
|---|---|---|---|
| 3,738,060 A * | 6/1973 | Jullien-Davin | ................... 47/81 |
| 2005/0241231 A1* | 11/2005 | Bissonnette et al. | .............. 47/81 |
| 2005/0246954 A1* | 11/2005 | Bissonnette et al. | .......... 47/62 A |
| 2006/0240544 A1 | 10/2006 | Shiau | |
| 2009/0293357 A1* | 12/2009 | Vickers et al. | ................ 47/62 A |
| 2010/0101145 A1* | 4/2010 | Bergen | .......................... 47/59 S |

FOREIGN PATENT DOCUMENTS

TW   201110871   4/2011

* cited by examiner

*Primary Examiner* — Monica Williams
(74) *Attorney, Agent, or Firm* — Muncy, Geissler, Olds & Lowe, P.C.

(57) ABSTRACT

A plant cultivation device includes: a planting container having an accommodation space; a planting pan disposed in the accommodation space of the planting container for dividing the accommodation space into a leaf region and a root region; an atomizing sheet disposed in a bottom plate of the planting container, used for performing spraying to the root region of the planting container; and a control circuit board, electrically connected to the atomizing sheet, used for controlling whether the atomizing sheet performs spraying, a nutrient solution tank, used for accommodating a nutrient solution; and a water absorbing material, wherein an end of the water absorbing material is disposed in the nutrient solution tank for taking the nutrient solution of the nutrient solution tank, and the other end of the water absorbing material is in contact with the atomizing sheet.

11 Claims, 6 Drawing Sheets

PLANT CULTIVATION DEVICE

CROSS-REFERENCE TO RELATED APPLICATION

This application claims the benefit of Taiwan Patent Application No. 102217836, filed on Sep. 24, 2013, which is hereby incorporated by reference for all purposes as if fully set forth herein.

BACKGROUND

1. Field of the Invention

The present invention relates to a plant cultivation device and more particularly pertains to a plant cultivation device using an atomizing sheet for aeroponic culture.

2. Related Art

In general, food vegetables and fruits are grown outdoors and are sprinkled with massive amounts of pesticides before harvest so as to prevent invasion of any pests and diseases. However, after consumers purchase these vegetables and fruits, due to that they are not washed thoroughly, excessive pesticides are taken in and cause considerable damage to consumers' health. Therefore, pesticide-free and fertilizer-free hydroponic culture starts to be prevalent in which nutrient solutions for the vegetables and fruits are disposed inside a water cultivation device, in such way to replace soil with liquid nutrient, ensuring more sanitary safety in growing vegetables and fruits.

Thus, in the prior art, a cultivation device suitable for home environment is introduced, used for hydroponic culture, as an instance, but its application is rather confined. Prior art introduced another cultivation device 900, as shown in FIG. 1, a motor 910 is used for pressing nutrient solution in a nutrient solution tub 920 upwards to strike a spray head 930, via which the nutrient solution is supplied in mist and sprayed onto root 941, enabling a plant 940 to get nutrient. However, the motor 910 and the nutrient solution tub 920 keep a distance from the plant 940, when the distance gets larger, the motor 910 will have to deliver more power to energize the spray head 930 to produce mists. When the size of the cultivation device gets bigger, more of the motor 910 in quantity or stronger power delivery from the motor 910 will have to be provided, which cause electricity waste.

Accordingly, a need remains for a plant cultivation device without resorting to motors to solve the foregoing defects.

SUMMARY

The objective of the present invention is to supply a plant cultivation device in that an atomizing sheet is used for transforming nutrient solution to mists.

To achieve the objective, the present invention provides a plant cultivation device including: a planting container having an accommodation space; a planting pan disposed in the accommodation space of the planting container for dividing the accommodation space into a leaf region and a root region; an atomizing sheet disposed in a bottom plate of the planting container, used for performing spraying to the root region of the planting container; and a control circuit board, electrically connected to the atomizing sheet, used for controlling whether the atomizing sheet performs spraying, a nutrient solution tank, used for accommodating a nutrient solution; and a water absorbing material, wherein an end of the water absorbing material is disposed in the nutrient solution tank for taking the nutrient solution of the nutrient solution tank, and the other end of the water absorbing material is in contact with the atomizing sheet.

The plant cultivation device of the present invention just uses the atomizing sheet in contact with the nutrient solution to transform the nutrient solution into mists, so as to eliminate the need for motors in the prior art and further conserves energy.

To make the other purposes, features, and advantages of the present invention, other than those set forth above, become more apparent, the present invention is described in detail with reference to the annexed drawings.

DETAILED DESCRIPTION

Figure 1:
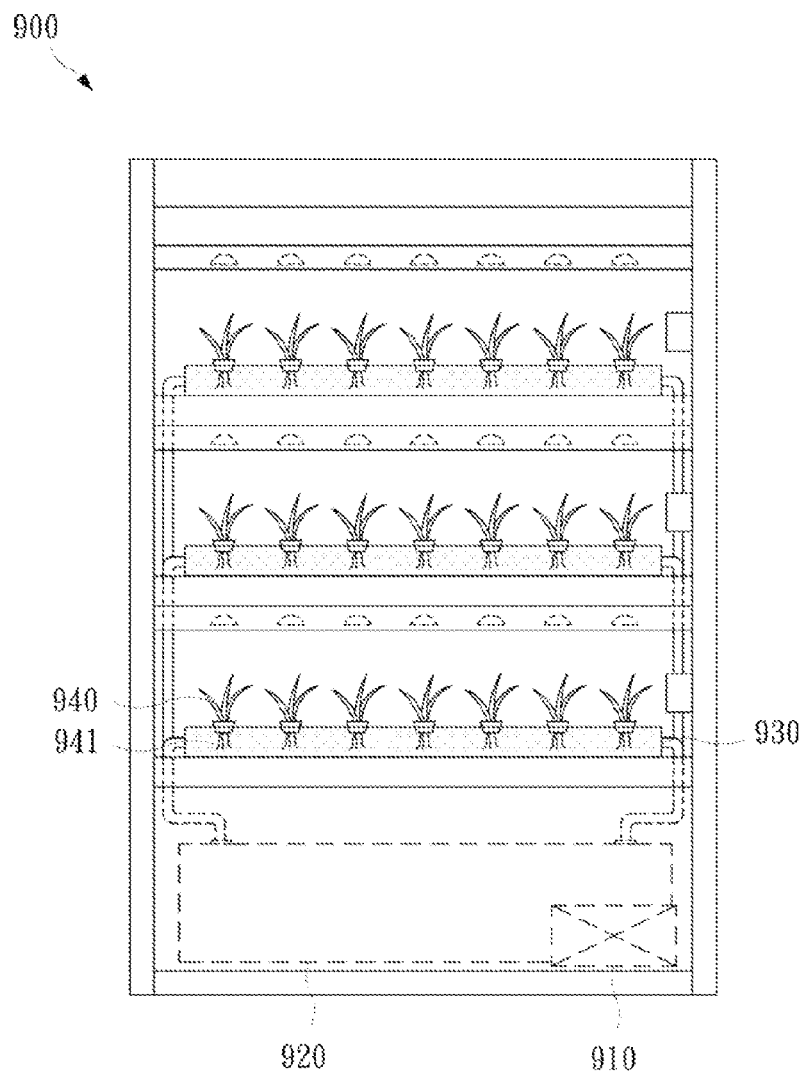
FIG. 1 is a schematic cross-sectional view of conventional cultivation device.
Figure 2:
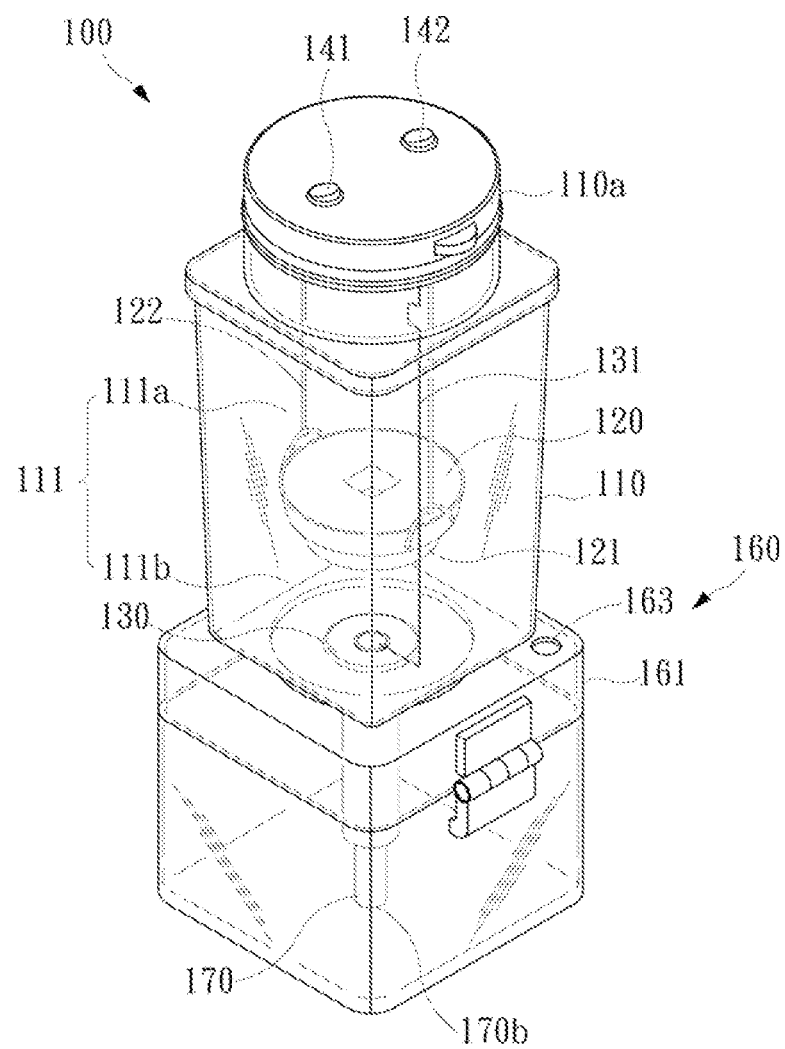
FIG. 2 is a perspective view of an embodiment of a combined plant cultivation device of the present invention.
Figure 3:
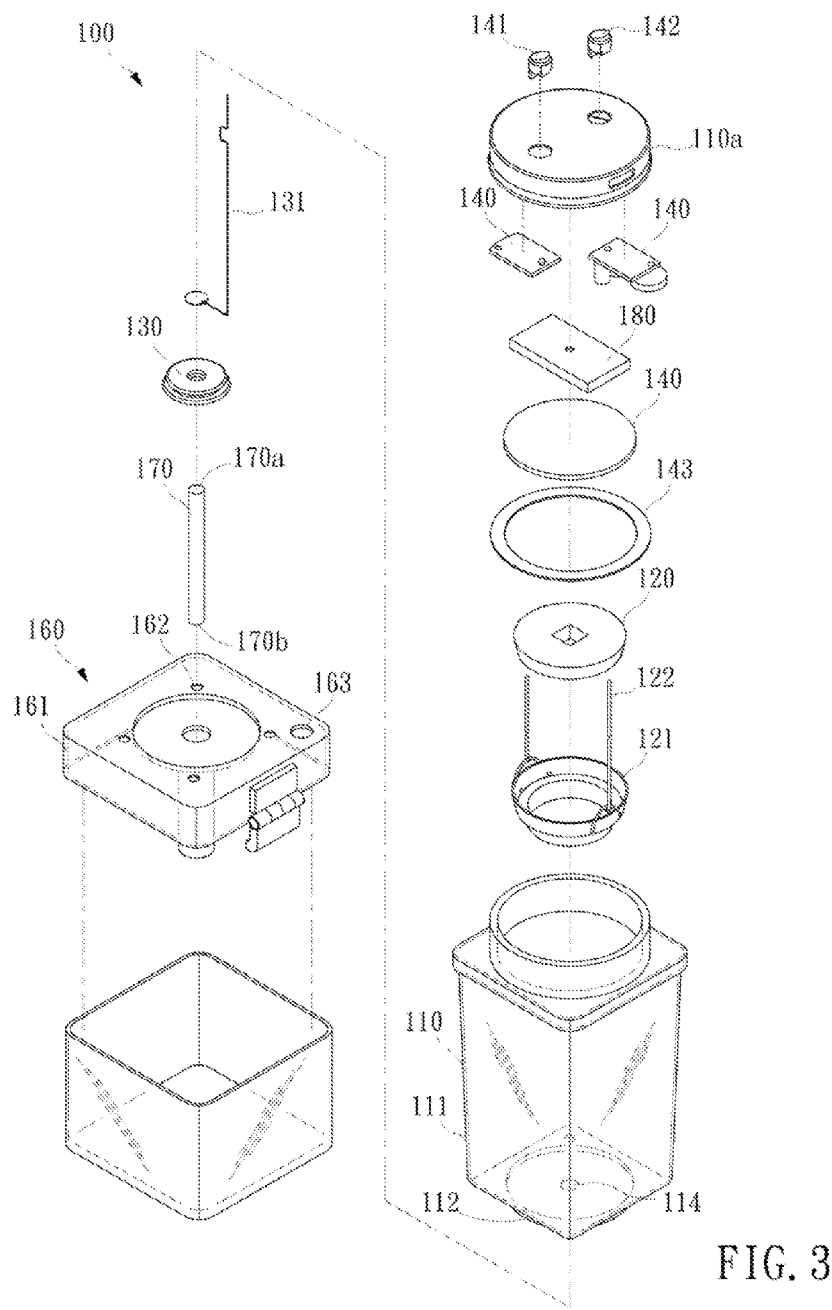
FIG. 3 is an exploded perspective view of an embodiment of a plant cultivation device of the present invention.

FIG. 2 is a perspective view of an embodiment of a combined plant cultivation device of the present invention. FIG. 3 is an exploded perspective view of an embodiment of a plant cultivation device of the present invention. The plant cultivation device 100 includes a planting container 110, a planting pan 120, an atomizing sheet 130 and a control circuit board 140. The planting container 110 has an accommodation space 111. The planting pan 120 is disposed in the accommodation space 111 of the planting container 110 for dividing the accommodation space 111 into a leaf region 111a and a root region 111b. The planting pan 120 stays within the accommodation space 111 of the planting container 110 by a pot body 121 and a wire 122. For instance, the way to use the pot body 121 and the wire 122 is initially arranging planting pan 120 inside the pot body 121, then fixing an end of the wire 122 to a roof 110a of planting container 110 and the other end of the wire 122 to the pot body 121 for making the planting pan 120 suspend within the accommodation space 111 of the planting container 110.

The atomizing sheet 130 is disposed in a bottom plate 112 of the planting container 110, and upper and lower surfaces of the atomizing sheet 130 are exposed. In the embodiment, the bottom plate 112 has a retaining hole 114, and the atomizing sheet 130 is retained in the retaining hole 114. The atomizing sheet 130 is used to perform spraying on the root region 111b of the planting container 110. The control circuit board 140 is electrically connected to the atomizing sheet 130 by an electrical wire 131 and is used for controlling the atomizing sheet 130 whether to perform spraying. The atomizing sheet 130 is a piezoelectric sheet, having a vibration layer, which has multiple micropores and can use power signal of high-frequency ultrasonic waves to promote the vibration layer of the atomizing sheet 130 generating oscillation and thereby reach the purpose of uniform mists.

The control circuit board 140 can be arranged in the roof 110a of the planting container 110 and a water proof sheet 143 is used for encircling the surrounding of the control circuit board 140. The water proof sheet 143 can prevent a circuit structure of the control circuit 140 from the influence of moisture in the accommodation space 111.

Figure 4:
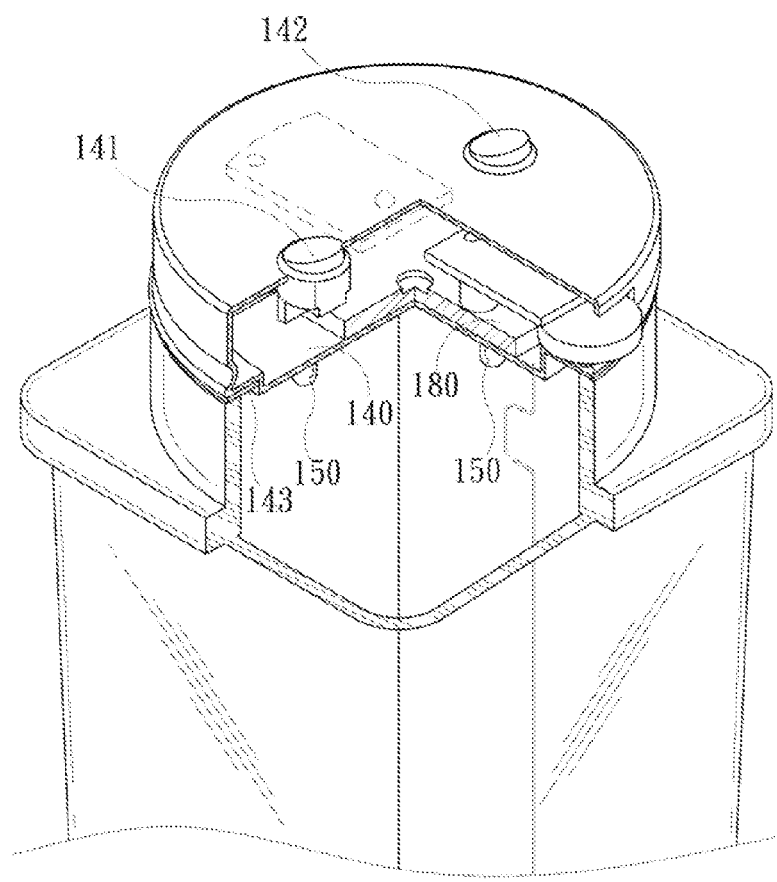
FIG. 4 is a partially cutaway perspective view of the roof over the accommodation space of a plant cultivation device of the present invention.

Please also refer to FIG. 4. The plant cultivation device 100 further includes a light source 150 and a rechargeable battery 180. The light source 150 is disposed in the roof 110a of the planting container 110 and is electrically connected to the control circuit board 140 for emitting light at the leaf region 111a of the planting container 110. The control circuit board 140 can be provided with a power switch 141 and an atomizer switch 142. The power switch 141 is electrically connected to the control circuit board 140 for controlling whether the light source 150 emits light. The atomizer switch 142 is electrically connected to the control circuit board 140 for controlling whether the atomizing sheet 130 performs spraying on the root region 111b of the planting container 110. The rechargeable battery 180 is electrically connected to the control circuit board 140 for supplying power to the control circuit board 140.

Figure 5:
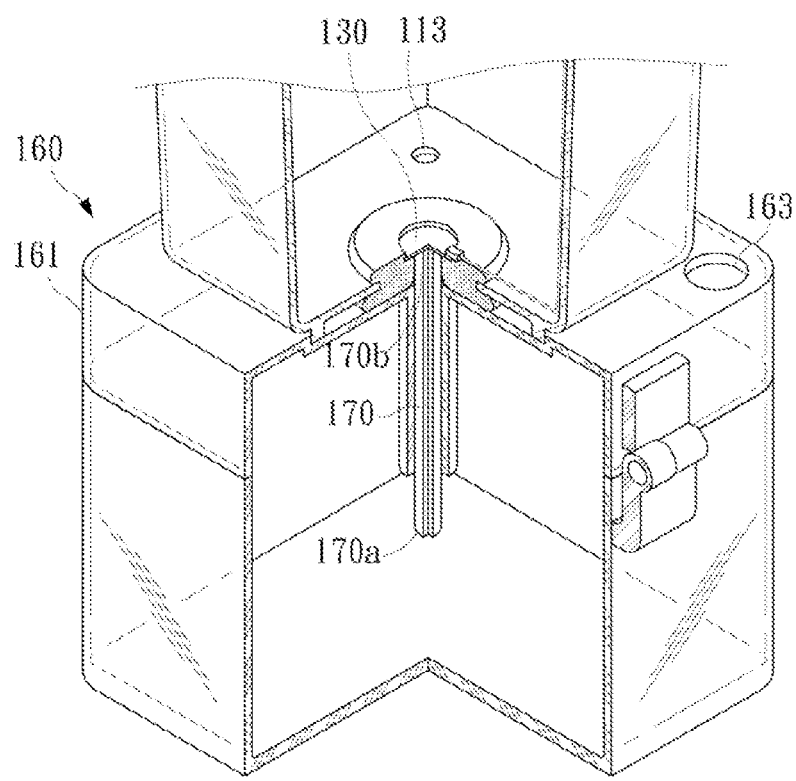
FIG. 5 is a partially cutaway perspective view of nutrient solution tank of a plant cultivation device of the present invention.

Please also refer to FIG. 5. The plant cultivation device 100 further includes a nutrient solution tank 160 and a water-absorbing material 170. The nutrient solution. tank 160 is used for accommodating nutrient solution. An end 170a of the water-absorbing material 170 is disposed in the nutrient solution tank 160 for taking the nutrient solution of the nutrient solution tank 160. The other end 170b of the water-absorbing material 170 is in contact with the atomizing sheet 130. The water-absorbing material 170 can be a cotton strip, a cloth strip or a sponge strip. When the atomizing sheet 130 is operated, the nutrient solution contained in the other end 170b of the water-absorbing material 170, by oscillation in the vibration layer of the atomizing sheet 130, is transformed into mists and spread over the root region 111b of the accommodation space 111. When the nutrient solution in the other end 170b of the water-absorbing material 170 is depleted, the end 170a of the water-absorbing material 170 will promptly absorb the nutrient solution in nutrient solution tank 160 to offset the lose of the nutrient solution in the other end 170b of the water-absorbing material 170.

The nutrient solution tank 160 further includes a top cap 161 and an inlet 162, the inlet 162 passing through the top cap 161. The planting container 110 includes an outlet 113, the outlet 113 passing through a bottom plate 112 of the planting container 110. The top cap 161 of the nutrient solution tank 160 abuts the bottom plate 112 of the planting container 110, and the inlet 162 of the nutrient solution tank 160 communicates with the outlet 113 of the planting container 110. When the atomizing sheet 130 performs spraying to the root region 111b of the planting container 110, if the moisture gets overheavy, leading steam condensed as nutrient solution, nutrient solution in the root region 111b backflows to nutrient solution tank 160 via the outlet 113 of planting container 110 and the inlet 162 of the nutrient solution tank 160, thereby keeping constant humidity in the root region 111b of the planting container 110.

When bottom plate 112 of the planting container 110 abuts top cap 161 of the nutrient solution tank 160, it is the shortest distance at which the water-absorbing material 170 contacts the nutrient solution of nutrient solution tank 160 and simultaneously contacts the atomizing sheet 130. The nutrient solution tank 160 further includes an adding orifice 163, the adding orifice 163 passing through the top cap 161 of the nutrient solution tank 160 to enable users to add the nutrient solution into the nutrient solution tank 160.

Figure 6:
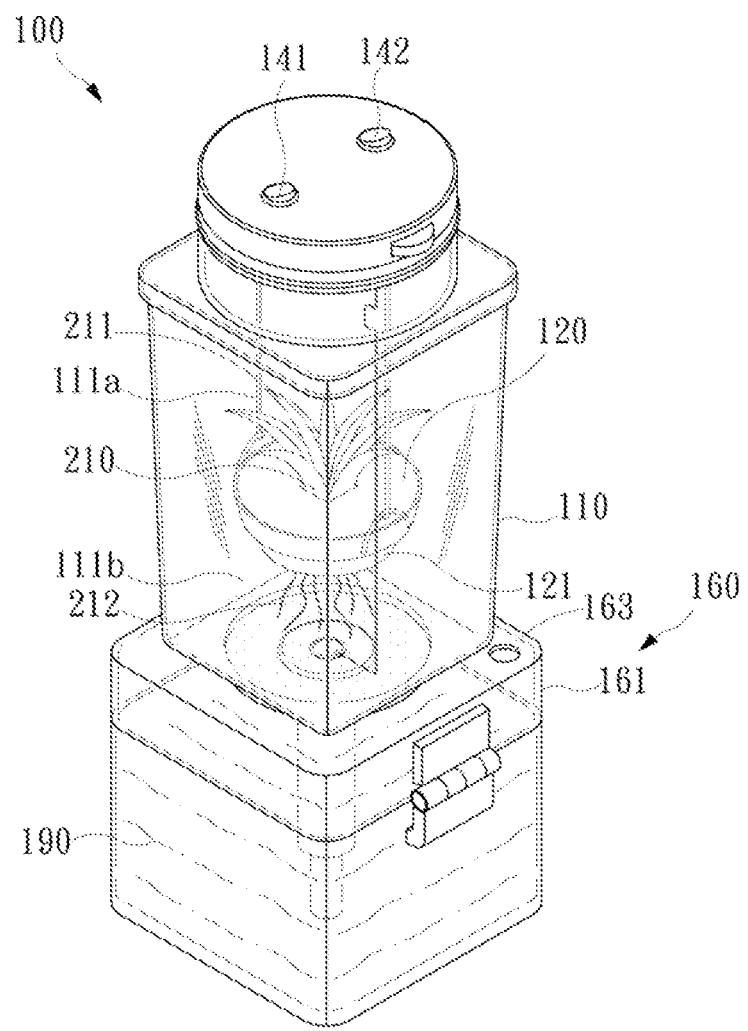
FIG. 6 is a perspective view of an embodiment of a combined plant cultivation device of the present invention, which illustrates use mode.

FIG. 6 is a perspective view of an embodiment of a combined plant cultivation device of the present invention, which illustrates a use mode of the plant cultivation device. When a crop 210 is cultivated in the planting pan 120, a leaf part 211 of the crop 210 is located in the leaf region 111a of the planting container 110. A root part 212 of the crop 210 is located in the root region 111b of the planting container 110. Users may pour the formulated nutrient solution 190 via the adding orifice 163 and then turn on the power switch 141 and the atomizer switch 142 mounted in the planting container 110, and the crop 910 can be lighted and sprayed simultaneously.

As aforementioned, the plant cultivation device of the present invention just uses the atomizing sheet in contact with the nutrient solution to transform the nutrient solution into mists, so as to eliminate the need for motors in the prior art and further conserves energy. Furthermore, the plant cultivation device of the present invention uses aeroponic culture, and the inlet of the nutrient solution tank communicates with the outlet of the planting container, so as to facilitate the nutrient solution in the root region backflowing into the planting container, and reach the maximum utilization of nutrient solution for water conservation. Moreover, the plant cultivation device of the present invention uses the rechargeable battery to supply power to the control circuit board, light source and atomizing sheet, and thus the appearance of the plant cultivation device can vary according to different designing concepts from designers. Furthermore, according to the plant cultivation device of the present invention, the planting container and the nutrient solution tank can be designed detachable and assembled for easy to carry.

The foregoing is considered as illustrative only of the implementation manners or embodiments of the technical solutions adopted by the present invention to solve the problems and it's not desired to limit the scope of the invention. Accordingly, all suitable modifications and equivalents may be resorted to, falling within the scope of the invention.

What is claimed is:

1. A plant cultivation device, comprising
a planting container, having an accommodation space;
a planting pan, disposed in the accommodation space of the planting container for dividing the accommodation space into a leaf region and a root region;
an atomizing sheet, disposed in a bottom plate of the planting container, used for performing spraying to the root region of the planting container; and
a control circuit board, electrically connected to the atomizing sheet, used for controlling whether the atomizing sheet performs spraying,
a nutrient solution tank, used for accommodating a nutrient solution; and
a water absorbing material, wherein an end of the water absorbing material is disposed in the nutrient solution tank for taking the nutrient solution of the nutrient solution tank, and the other end of the water absorbing material is in contact with the atomizing sheet.

2. The plant cultivation device as claimed in claim 1, further comprising a light source disposed in a roof of the planting container and electrically connected to the control circuit board for emitting light at the leaf region of the planting container.

3. The plant cultivation device as claimed in claim 2 further comprising a power switch electrically connected to the control circuit board for controlling whether the light source emits light.

4. The plant cultivation device as claimed in claim 1 wherein the water absorbing material is a cotton strip, a cloth strip or a sponge strip.

5. The plant cultivation device as claimed in claim 1, wherein the planting container and the nutrient solution tank are detachable and assemblable.

6. The plant cultivation device as claimed in claim 1, wherein the nutrient solution tank comprises a top cap and an inlet, the inlet passes through the top cap, the planting container comprises an outlet, the outlet passes through the bottom plate of the planting container, the top cap of the nutrient solution tank abuts the bottom plate of the planting container, and the inlet of the nutrient solution tank communicates with the outlet of the planting container.

7. The plant cultivation device as claimed in claim 6, wherein the nutrient solution tank further comprises an adding orifice, the adding orifice passing through the top cap of the nutrient solution tank.

8. The plant cultivation device as claimed in claim 1 further comprising a rechargeable battery electrically connected to the control circuit board for supplying power to the control circuit board.

9. The plant cultivation device as claimed in claim 1, further comprising a pot body and a wire, wherein the planting pan is disposed within the pot body, an end of the wire is fixed to the roof of the planting container, and the other end of the wire being is fixed to the pot body for making the planting pan suspend within the accommodation space of the planting container.

10. The plant cultivation device as claimed in claim 1, further comprising an atomizer switch electrically connected to the control circuit board for controlling whether the atomizing sheet performs spraying on the root region of the planting container.

11. The plant cultivation device as claimed in claim 1, wherein the atomizing sheet is a piezoelectric sheet.

* * * * *